United States Patent
Yamashita (10) Patent No.: US 8,392,098 B2
(45) Date of Patent: Mar. 5, 2013

(54) ABNORMALITY DIAGNOSIS DEVICE OF INTERNAL COMBUSTION ENGINE

(75) Inventor: Hiroshi Yamashita, Anjo (JP)

(73) Assignee: Denso Corporation, Kariya (JP)

( * ) Notice: Subject to any disclaimer, the term of this patent is extended or adjusted under 35 U.S.C. 154(b) by 462 days.

(21) Appl. No.: 12/838,675

(22) Filed: Jul. 19, 2010

(65) Prior Publication Data

US 2011/0023852 A1    Feb. 3, 2011

(30) Foreign Application Priority Data

Jul. 29, 2009   (JP) .................................. 2009-176051

(51) Int. Cl.
*G06F 19/00* (2011.01)
*F02M 25/06* (2006.01)

(52) U.S. Cl. .................. 701/114; 701/103; 123/572

(58) Field of Classification Search .......... 123/572–574; 701/103, 114

See application file for complete search history.

(56) References Cited

U.S. PATENT DOCUMENTS

| 3,581,721 | A  | * | 6/1971 | Horiuchi | ........................ | 123/574 |
| 6,098,603 | A  | * | 8/2000 | Maegawa et al. | ............. | 123/572 |
| 6,247,464 | B1 | * | 6/2001 | Maegawa et al. | ............. | 123/572 |
| 6,338,329 | B2 | * | 1/2002 | Maegawa et al. | ............. | 123/572 |
| 8,145,406 | B2 | * | 3/2012 | Satou | ............................ | 701/103 |
| 8,171,922 | B2 | * | 5/2012 | Tanaka et al. | .................. | 123/572 |

FOREIGN PATENT DOCUMENTS

JP     2007-002838     1/2007

* cited by examiner

*Primary Examiner* — Willis R Wolfe, Jr.
(74) *Attorney, Agent, or Firm* — Nixon & Vanderhye PC (57) ABSTRACT

An engine has a PCV passage connected to an intake system for recirculating a blow-by gas to the intake system and an air flow meter provided upstream of a connection between the PCV passage and the intake system in the intake system for sensing an intake air flow rate. An electronic control unit (ECU) performing various types of control of the engine diagnoses a clogging abnormality of the PCV passage based on pulsation width of the intake air flow rate sensed with the air flow meter. A thermal type sensor having a heating section and a temperature sensing section provided on a semiconductor substrate is used as the air flow meter.

6 Claims, 4 Drawing Sheets

ABNORMALITY DIAGNOSIS DEVICE OF INTERNAL COMBUSTION ENGINE

CROSS REFERENCE TO RELATED APPLICATION

This application is based on and incorporates herein by reference Japanese Patent Application No. 2009-176051 filed on Jul. 29, 2009.

BACKGROUND OF THE INVENTION

1. Field of the Invention

The present invention relates to an abnormality diagnosis device of an internal combustion engine for diagnosing a clogging abnormality of a PCV passage (positive crankcase ventilation passage) recirculating a blow-by gas to an intake system.

2. Description of Related Art

Conventionally, there have been proposed various devices for diagnosing an abnormality related to a PCV passage (for example, refer to Patent document 1: JP-A-2007-2838). According to Patent document 1, an air quantity upstream of a connection between an intake system and the PCV passage in an intake passage is sensed with an air flow meter. The abnormality in the PCV passage is diagnosed based on a result of comparison between the sensed air quantity and a determination value. If the PCV passage breaks or disengages from the intake system, an outside air flows into the intake system via the broken portion or disengaged portion, so the air quantity (average flow rate) flowing upstream of the connection between the intake system and the PCV passage decreases. In consideration of this point, according to Patent document 1, the intake air quantity sensed with the air flow meter is monitored to detect an air leakage resulting from the breakage of the PCV passage, the disengagement of the PCV passage from the intake system or the like.

The technology of Patent document 1 diagnoses the air leakage due to the breakage of the PCV passage and the like but cannot diagnose a clogging abnormality of the PCV passage. In the case of the air leakage due to the breakage of the PCV passage and the like, the outside air flows in via the portion of the air leakage, so the air quantity (average flow rate) introduced into the intake system via the PCV passage increases. If the clogging abnormality is caused in the PCV passage by incorporation of extraneous matters and the like, a diameter of the PCV passage decreases and therefore the air quantity (average flow rate) introduced into the intake system through the PCV passage does not increase. Therefore, in the case of the clogging abnormality, the increase or decrease of the average flow rate as in Patent document 1 does not appear upstream of the connection between the intake system and the PCV passage. Therefore, the clogging abnormality cannot be diagnosed with the above-described method.

SUMMARY OF THE INVENTION

It is an object of the present invention to provide an abnormality diagnosis device of an internal combustion engine capable of diagnosing a clogging abnormality of a PCV passage.

According to a first example aspect of the present invention, an abnormality diagnosis device is used for an internal combustion engine having a PCV passage as a branch passage connected to an intake system of the internal combustion engine for recirculating a blow-by gas to the intake system and a flow sensor provided upstream of a connection between the PCV passage and the intake system in the intake system for sensing an intake air flow rate. The abnormality diagnosis device has a pulsation width sensing section for sensing pulsation width of the intake air flow rate sensed with the flow sensor and an abnormality diagnosing section for diagnosing a clogging abnormality of the PCV passage based on the sensed pulsation width.

When the clogging abnormality is caused by incorporation of extraneous matters into the PCV passage or the like, a flow rate of the blow-by gas passing through the PCV passage decreases. In such the case, there is a possibility that combustion processing of the blow-by gas cannot be performed properly. Therefore, it is necessary to diagnose the clogging abnormality of the PCV passage. The inventor of the present invention earnestly studied a method for diagnosing the clogging abnormality of the PCV passage. Eventually, the inventor found that the intake air pulsation accompanying the opening and closing of an intake valve of the internal combustion engine is influenced upstream of the connection between the PCV passage and the intake system by the flow of the gas flowing from the PCV passage to the intake system. The inventor also found that a degree of the influence changes according to a diameter of the PCV passage.

Therefore, according to the above-described aspect of the present invention, the flow sensor is provided upstream of the connection between the PCV passage and the intake system. It is diagnosed whether the clogging abnormality exists in the PCV passage based on the pulsation width of the intake air flow rate sensed with the flow sensor. With such the construction, the clogging abnormality of the PCV passage can be diagnosed with high accuracy by monitoring the output value of the flow sensor. More specifically, there is a tendency that the pulsation width of the intake air flow rate upstream of the connection between the PCV passage and the intake system decreases as the diameter of the PCV passage reduces. Therefore, it may be diagnosed that there is the clogging abnormality when the pulsation width is equal to or smaller than a determination value.

According to a second example aspect of the present invention, the internal combustion engine has another branch passage in addition to the PCV passage, the another branch passage branching from the intake system downstream of the flow sensor, and an opening-closing valve that adjusts a flow passage cross-sectional area of at least one of the branch passages including the PCV passage. The abnormality diagnosing section diagnoses a clogging abnormality in at least one of the branch passages including the PCV passage based on an opening/closing state of the opening-closing valve and the pulsation width.

If the construction has at least one branch passage branching from the intake system in addition to the PCV passage, it is anticipated that intake air pulsation changes with a fluid flowing into the intake system through the branch passage. In such the construction, if the fluid is allowed to pass through the multiple branch passages including the PCV passage, there is a case where the branch passage causing the clogging abnormality cannot be specified even when the occurrence of the clogging abnormality is diagnosed based on the pulsation width of the intake air flow rate. Regarding this point, if the opening-closing valve is closed in the branch passage having the opening-closing valve adjusting the flow passage cross-sectional area, the fluid passing through the passage having the opening-closing valve does not influence the intake air pulsation. Therefore, the passage having the opening-closing valve can be excluded from the diagnostic object. It can be said that the influence on the change of the intake air pulsation differs according to the opening-closing state of the opening-closing valve.

Regarding this point, according to the above-described aspect of the present invention, the abnormality diagnosis aspect of the present invention, the abnormality diagnosis is performed in consideration of the opening/closing state of the opening-closing valve provided in the branch passage. Thus, the diagnosis can be performed for the branch passage that influences the change in the pulsation width. Accordingly, the abnormality diagnosis can be performed suitably.

The flow passage cross-sectional area reduces both in a case where a clogging abnormality occurs in the branch passage and a case where the opening-closing valve of the branch passage is operated in a valve-closing direction for closing the opening-closing valve. Therefore, the same tendency appears in a mode of change of the intake air pulsation accompanying the occurrence of the clogging abnormality and a mode of change of the intake air pulsation accompanying the valve-closing of the opening-closing valve. Therefore, if the opening-closing valve of the branch passage is changed in the valve-closing direction when the clogging abnormality has not occurred in the branch passage, the pulsation width changes in the same way as the case of the occurrence of the clogging abnormality. When the opening-closing valve of the branch passage is changed in a valve-opening direction for opening the opening-closing valve, the intake air pulsation changes in a way opposite to the case of the occurrence of the clogging abnormality. When the clogging abnormality occurs in the branch passage, it is anticipated that the intake air pulsation hardly changes even if the opening-closing valve of the branch passage causing the clogging abnormality is changed in the valve-opening direction or in the valve-closing direction.

According to a third example aspect of the present invention taking this point into account, the abnormality diagnosing section diagnoses the clogging abnormality based on increase or decrease in the pulsation width at the time when the opening/closing state of the opening-closing valve is changed in a valve-closing direction or in a valve-opening direction. Thus, the passage causing the clogging abnormality can be specified in the construction having the multiple branch passages branching from the intake system.

According to a fourth example aspect of the present invention, the another branch passage is an EGR passage (exhaust gas recirculation passage) for providing communication between an exhaust system and the intake system of the internal combustion engine and for recirculating a part of exhaust gas to the intake system. With such the construction, when the clogging abnormality occurs in at least one of the PCV passage and the EGR passage both connected to the intake system, the passage causing the abnormality can be specified.

If the average flow rate of the fluid passing through the intake system is large, the intake air pulsation accompanying the opening and closing of the intake valve of the internal combustion engine increases. As a result, it is anticipated that the change of the pulsation width due to the clogging of the PCV passage cannot be detected.

According to a fifth example aspect of the present invention taking this point into account, the abnormality diagnosing section performs the abnormality diagnosis based on the pulsation width when an average flow rate of a fluid passing through the intake system is in a predetermined low flow rate range. With such the construction, the abnormality diagnosis is performed under the situation where the change of the pulsation width resulting from the clogging of the PCV passage can be detected. Therefore, the diagnostic accuracy can be improved. For example, the average flow rate of the fluid in the intake system becomes equal to or smaller than a predetermined value when an operation state of the internal combustion engine is a low-load state or an idling state.

The intake air pulsation is caused by increase and decrease of the flow rate of the air introduced into the intake system accompanying the opening and closing of the intake valve of the internal combustion engine. Therefore, a highly sensitive flow sensor should be preferably used to sense the change of the pulsation width with high accuracy.

According to a sixth example aspect of the present invention taking this point into account, the flow sensor is a thermal type sensor that has a heating section and a temperature sensing section provided on a semiconductor substrate. The flow sensor according to the above-described aspect of the present invention has better response than a hot-wire sensor and the like. Therefore, the flow sensor according to the above-described aspect of the present invention has high sensing accuracy for sensing the air flow rate, thereby improving the diagnostic accuracy.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS (First Embodiment)

Figure 1:
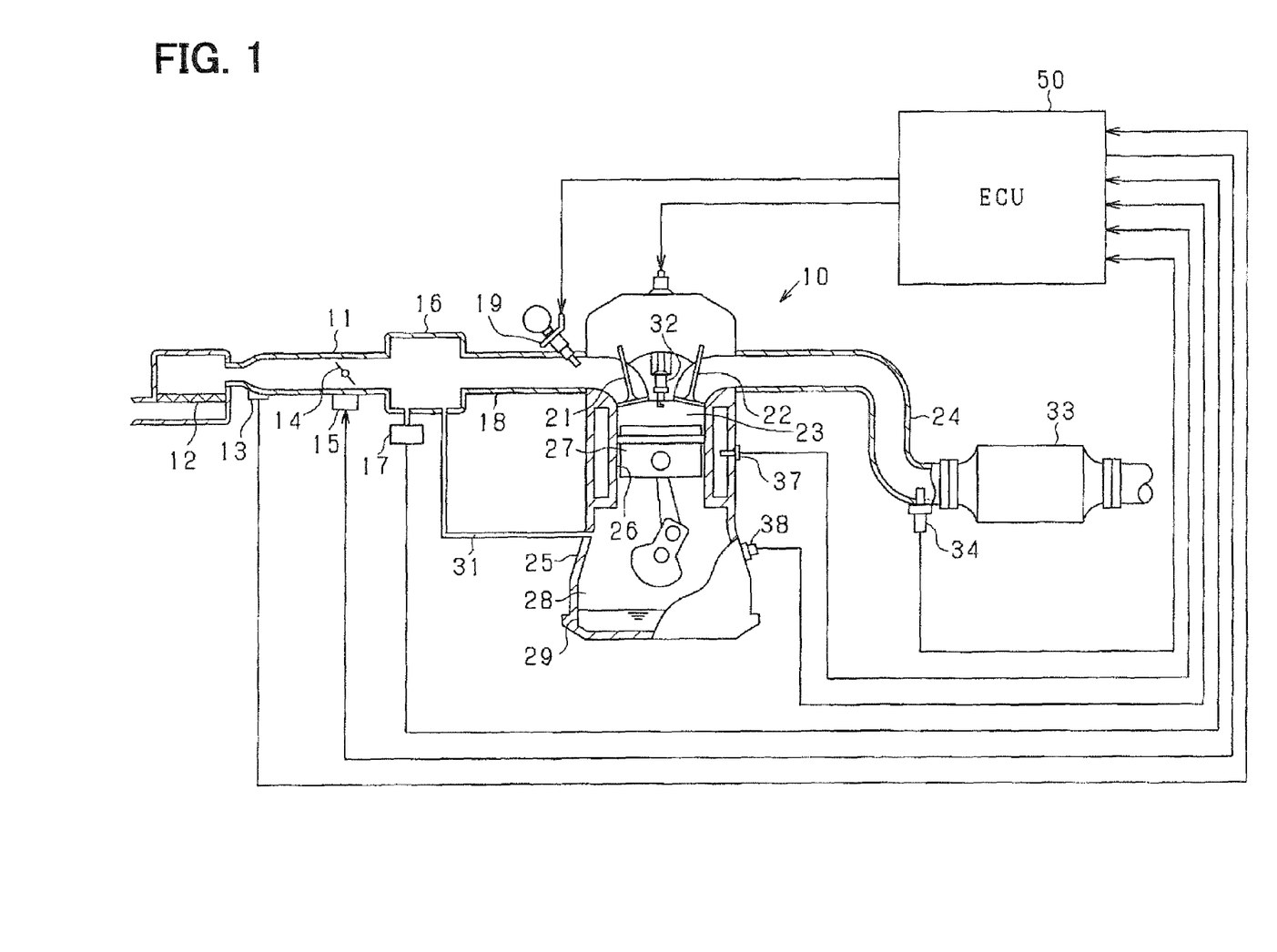
FIG. 1 is a schematic diagram showing an entire construction of an engine control system according to a first embodiment of the present invention.

Hereafter, a first embodiment of the present invention will be described with reference to the drawings. The present embodiment is constructed as an engine control system for an in-vehicle multi-cylinder gasoline engine (internal combustion engine). The control system performs control of a fuel injection quantity, control of ignition timing and the like centering on an electronic control unit (referred to as ECU, hereinafter). FIG. 1 is a schematic construction diagram schematically showing the entire engine control system.

In the engine 10 shown in FIG. 1, an air cleaner 12 is provided in the most upstream portion of an intake pipe 11 (intake passage). An air flow meter 13 for sensing an intake air quantity is provided downstream of the air cleaner 12.

In the present embodiment, a thermal type flow sensor is adopted as the air flow meter 13. The air flow meter 13 has a semiconductor substrate, on which a heating resistor and a temperature sensing resistor are provided. The heating resistor gives a heat to an airflow. The temperature sensing resistor is formed in a thin-walled portion of the substrate for sensing temperature of the airflow.

A control circuit is connected to the heating resistor and the temperature sensing resistor. The control circuit controls a current value flowing through the heating resistor such that difference between temperature of the heating resistor and the temperature sensed with the temperature sensing resistor stays constant. The control circuit outputs an electric signal corresponding to the current value to an ECU 50. A heat discharge amount of the heating resistor increases as the flow rate of the air flowing through the intake passage increases. Therefore, the control circuit increases the current value flowing through the heating resistor as the flow rate of the air increases, thereby maintaining the difference between the temperature of the heating resistor and the temperature sensed with the temperature sensing resistor to be constant. The electric signal corresponding to the current value of the heating resistor is outputted to the ECU 50. The ECU 50 performs computation processing of the output signal to calculate the air flow rate.

A thermal type flow sensor having an operating principle different from the above-described construction may be used as the air flow meter 13 of the present embodiment. For example, a flow sensor having multiple (e.g., two) temperature sensing resistors, which are arranged upstream and downstream of a heating resistor respectively across the heating resistor on a semiconductor substrate, may be used. In such the sensor, temperature difference corresponding to the air flow rate occurs between the two temperature sensing resistors. The sensor outputs an electric signal corresponding to the temperature difference. The air flow rate is calculated based on the electric signal.

A throttle valve 14 is provided downstream of the air flow meter 13. An opening degree of the throttle valve 14 (throttle opening degree) is adjusted by a throttle actuator 15 such as a DC motor and is sensed with a throttle position sensor incorporated in the throttle actuator 15.

A surge tank 16 is provided downstream of the throttle valve 14, and an intake pipe pressure sensor 17 for sensing intake pipe pressure is provided to the surge tank 16. An intake manifold 18 for introducing the air into each cylinder of the engine 10 is provided to the surge tank 16. An electromagnetic drive type injector 19 for injecting and supplying fuel is fixed to the intake manifold 18 near an intake port of each cylinder.

An intake valve 21 and an exhaust valve 22 are provided to the intake port and an exhaust port of the engine 10 respectively. The air in the surge tank 16 is introduced into a combustion chamber 23 by a valve-opening operation of the intake valve 21. Exhaust gas after combustion is discharged to an exhaust pipe 24 by a valve-opening operation of the exhaust valve 22.

A cylinder 26 is provided in a cylinder block 25 of the engine 10. A piston 27 is arranged in the cylinder 26 slidably. A crankcase 28 is provided under the cylinder 26 in the cylinder block 25. An oil pan 29 for storing engine oil as lubricating oil is formed under the crankcase 28 in the cylinder block 25.

The crankcase 28 is connected to an intake system (surge tank 16 in present embodiment) through a PCV passage 31. When a gap between sliding portions of the cylinder 26 and the piston 27 is relatively large (e.g., before completion of warm-up of the engine 10), the fuel in the combustion chamber 23 leaks out to an inside of the crankcase 28 through the gap and is mixed in the engine oil in the oil pan 29. The fuel (blow-by gas) leaked into the crankcase 28 evaporates with progression of the warm-up of the engine 10 and is discharged to the surge tank 16 via the PCV passage 31.

Spark plugs 32 are fixed to a cylinder head of the engine 10 for the respective cylinders. High voltage is applied to the spark plug 32 at desired ignition timing through an ignition device (not shown) consisting of an ignition coil and the like. Due to the applied high voltage, a spark discharge occurs between opposed electrodes of the spark plug 32. Thus, a mixture gas introduced into the combustion chamber 23 is ignited and used for the combustion.

A catalyst 33 such as a three-way catalyst for purifying CO, HC, NOx and the like in the exhaust gas is provided in the exhaust pipe 24. An O2 sensor 34 is provided upstream of the catalyst 33 for sensing an air-fuel ratio (or oxygen concentration) of the mixture gas, i.e., the exhaust gas.

A coolant temperature sensor 37 and a crank angle sensor 38 are fixed to the engine 10. The coolant temperature sensor 37 senses coolant temperature. The crank angle sensor 38 outputs a rectangular crank angle signal at every predetermined crank angle (e.g., in cycle of 30 degrees CA) of the engine 10.

The ECU 50 is mainly constructed of a microcomputer, which consists of CPU, ROM, RAM and the like. The ECU 50 executes various kinds of control programs stored in the ROM to perform various types of control of the engine 10 in accordance with an engine operation state of each time. That is, the ECU 50 receives the sensing signals respectively from the above-described various sensors and the like and calculates a fuel injection quantity, the ignition timing and the like based on the various sensing signals. The ECU 50 controls drive of the injector 19 and the ignition device and controls the opening degree of the throttle valve 14 based on the calculation results.

The ECU 50 performs abnormality diagnosis processing for diagnosing a clogging abnormality of the PCV passage 31, which is a branch passage branching from the intake pipe 11. The inventor of the present invention found that an intake air pulsation occurring in the intake passage with opening and closing of the intake valve 21 is influenced upstream of the connection between the intake pipe 11 and the PCV passage 31 by a flow of the gas flowing from the PCV passage 31 to the intake passage and that the influence varies according to a diameter of the PCV passage 31. The inventor invented a method of clogging abnormality diagnosis by focusing on these findings.

Figure 2:
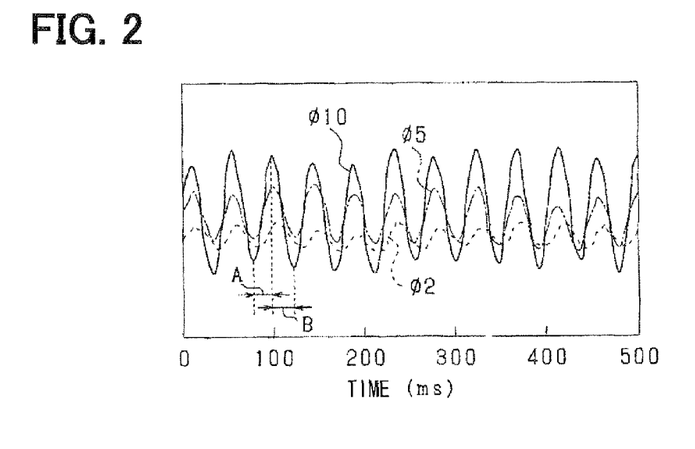
FIG. 2 is a diagram showing a relationship between a transition of an air flow rate and a diameter of a PCV passage according to the first embodiment.

Hereafter, a relationship between the intake air pulsation and the diameter of the PCV passage 31 will be explained in detail with reference to FIG. 2. FIG. 2 is a diagram showing a relationship between a transition of an air flow rate sensed with the air flow meter 13 and the diameter of the PCV passage 31. In FIG. 2, a solid line shows a case where a passage diameter of the PCV passage 31 is 10 mm, a chained lines shows a case where the passage diameter is 5 mm, and a broken line shows a case where the passage diameter is 2 mm. FIG. 2 shows a case of idling of a six-cylinder engine.

As shown in FIG. 2, the air flow rate sensed with the air flow meter 13 changes periodically according to the opening and closing of the intake valve 21. More specifically, if the air in the surge tank 16 is introduced into the combustion chamber 23 by the opening operation of the intake valve 21, formation of the airflow in a fair current direction is promoted in the intake passage. Thus, the intake air quantity increases (in period A in FIG. 2). If a closing operation of the intake valve 21 is performed in this state, the introduction of the air of the surge tank 16 into the combustion chamber 23 is stopped by the closing operation, and the airflow in a back current direction is formed in the intake passage. Thus, the intake air quantity decreases (in period B in FIG. 2). In this way, the intake air pulsation is caused in the intake passage by the repetition of the increase and the decrease of the intake air quantity (air flow rate) accompanying the opening and the closing of the intake valve 21.

As shown in FIG. 2, pulsation width of the air flow rate sensed with the air flow meter 13 decreases as the diameter of the PCV passage 31 reduces. It is thought that such the tendency arises because a fluid (blow-by gas) introduced from the PCV passage 31 into the intake passage has a pulsation. That is, it is thought that the tendency arises because the quantity of the blow-by gas recirculated into the intake passage decreases and the pulsation formed in the intake passage by the blow-by gas reduces as the clogging abnormality of the PCV passage 31 proceeds more and the diameter of the PCV passage 31 reduces.

Therefore, in the present embodiment, the clogging abnormality of the PCV passage 31 is diagnosed based on the pulsation width of the intake air flow rate sensed with the air flow meter 13. More specifically, the pulsation width is calculated based on the intake air flow rate sensed with the air flow meter 13, and the calculated pulsation width is compared with an abnormality determination value. If the calculated pulsation width is equal to or smaller than the abnormality determination value, it is determined that the clogging abnormality has occurred in the PCV passage 31.

Next, the abnormality diagnosis processing for diagnosing the clogging abnormality of the PCV passage 31 according to the present embodiment will be explained with reference to a flowchart of FIG. 3. The ECU 50 repeatedly performs the processing in every predetermined cycle.

Figure 3:
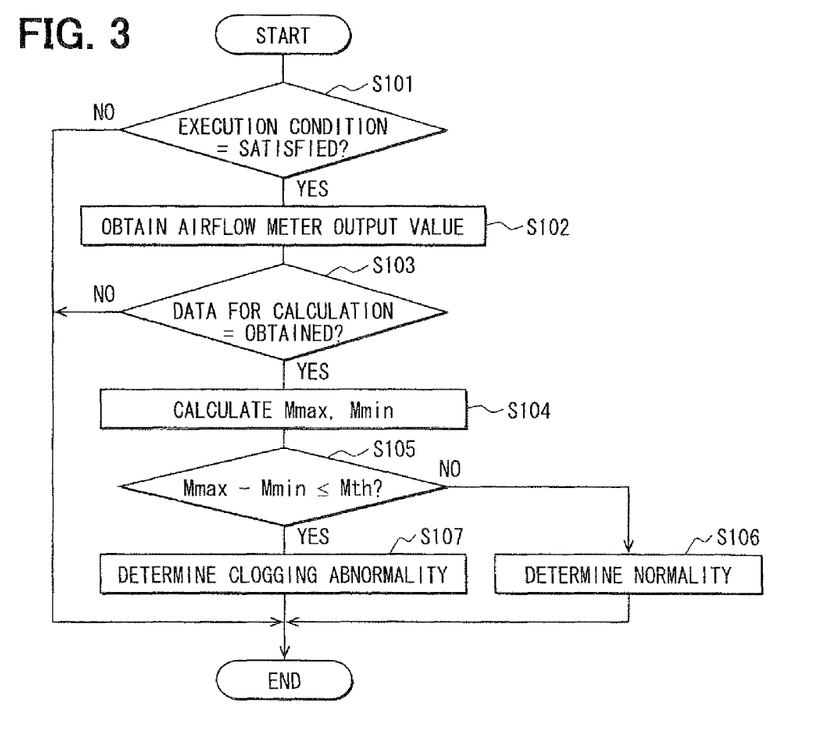
FIG. 3 is a flowchart showing a processing procedure of clogging abnormality diagnosis processing of the PCV passage according to the first embodiment.

In FIG. 3, first in S101 (S means "Step"), it is determined whether an execution condition of the abnormality diagnosis by the processing is satisfied. In the present embodiment, the execution condition includes a condition that the engine 10 is performing a predetermined low-load operation or is idling. That is, the execution condition includes a condition that an average value of the air flow rate sensed with the air flow meter 13 (average flow rate in predetermined time) is equal to or smaller than a predetermined value. It may be determined whether the average flow rate is equal to or smaller than the predetermined value based on the throttle opening degree sensed with the throttle position sensor. If the engine load is heavy and the air flow rate in the intake passage is large, the large intake air pulsation accompanying the opening and closing of the intake valve 21 arises in the intake passage. In such the case, it becomes difficult to find the pulsation change caused by the clogging abnormality of the PCV passage 31. Therefore, the abnormality diagnosis according to the present embodiment is performed when the average flow rate is relatively small.

When the execution condition is satisfied, the process proceeds to S102 and following steps. The output value of the air flow meter 13 is obtained and stored in S102. In S103, it is determined whether obtainment of necessary number of the data (air flow meter output values) necessary for calculating the pulsation width has been completed. In the present embodiment, the determination in S103 is performed based on an elapsed time from a predetermined reference timing. The elapsed time from the predetermined reference timing may be set to include the opening operation period (period A in FIG. 2) and the closing operation period (period B in FIG. 2) of the intake valve 21 in at least one cylinder.

When the obtainment of the necessary number of the data for the calculation of the pulsation width is completed, the process proceeds to S104. In S104, the maximum value Mmax (local maximum value) and the minimum value Mmin (local minimum value) of the air flow meter output value are calculated based on the obtained air flow meter output values. When the maximum value Mmax and the minimum value Mmin are calculated, for example, the maximum value Mmax and the minimum value Mmin are extracted from the successively obtained air flow meter output values with the use of a peak hold circuit by performing a separate routine (not shown).

In following S105, the pulsation width is calculated by subtracting the minimum value Mmin from the maximum value Mmax, and it is determined whether the calculated pulsation width is equal to or smaller than an abnormality determination value Mth. When the pulsation width is larger than the abnormality determination value Mth, the process proceeds to S106, in which it is determined that there is no clogging abnormality of the PCV passage 31. When the pulsation width is equal to or smaller than the abnormality determination value Mth, the process proceeds to S107, in which it is determined that there is a clogging abnormality of the PCV passage 31. In this case, the existence of the abnormality is reported to a driver by lighting a warning light or by generating a warning sound, and abnormality information is stored in a backup memory or the like.

The present embodiment described above exerts following effects.

The air flow meter 13 is arranged upstream of the connection between the intake system and the PCV passage 31 in the intake system of the engine 10. It is determined whether the clogging abnormality has occurred in the PCV passage 31 based on the pulsation width of the intake air flow rate sensed with the air flow meter 13. Therefore, the clogging abnormality of the PCV passage 31 can be diagnosed with high accuracy by monitoring the output value of the air flow meter 13.

The abnormality diagnosis based on the pulsation width is performed when the average flow rate of the air in the intake passage is equal to or smaller than the predetermined value. Therefore, the abnormality diagnosis can be performed under the situation where the change of the pulsation width resulting from the clogging of the PCV passage 31 can be detected. Accordingly, the diagnostic accuracy of the abnormality diagnosis based on the pulsation width can be improved.

As the air flow meter 13, the thermal type sensor having the heating resistor and the temperature sensing resistor arranged on the semiconductor substrate is used. Therefore, the air flow rate in the intake passage can be sensed with higher accuracy than in the case where a hot-wire sensor or the like is used. Therefore, the change of the pulsation width can be sensed with high accuracy, and eventually the accuracy of the abnormality diagnosis based on the pulsation width can be improved.

The PCV passage 31 has the small diameter as compared to other branch passages such as an EGR passage and tends to cause the clogging abnormality due to incorporation of the extraneous matters. Regarding this point, according to the present embodiment, the clogging abnormality of the PCV passage 31 is diagnosed based on the pulsation width of the intake air flow rate as described above. Thus, the clogging abnormality of the PCV passage 31 can be detected appropriately.

(Second Embodiment)

Next, a second embodiment of the present invention will be described, focusing on differences from the first embodiment. In the above-described first embodiment, the clogging abnormality of the PCV passage 31 is diagnosed based on the pulsation width of the intake air flow rate. In the second embodiment, a clogging abnormality in the EGR passage is diagnosed based on the pulsation width of the intake air flow rate in addition to the diagnosis of the PCV passage. The EGR passage is a branch passage that branches from the intake pipe and that is different from the PCV passage.

Figure 4:
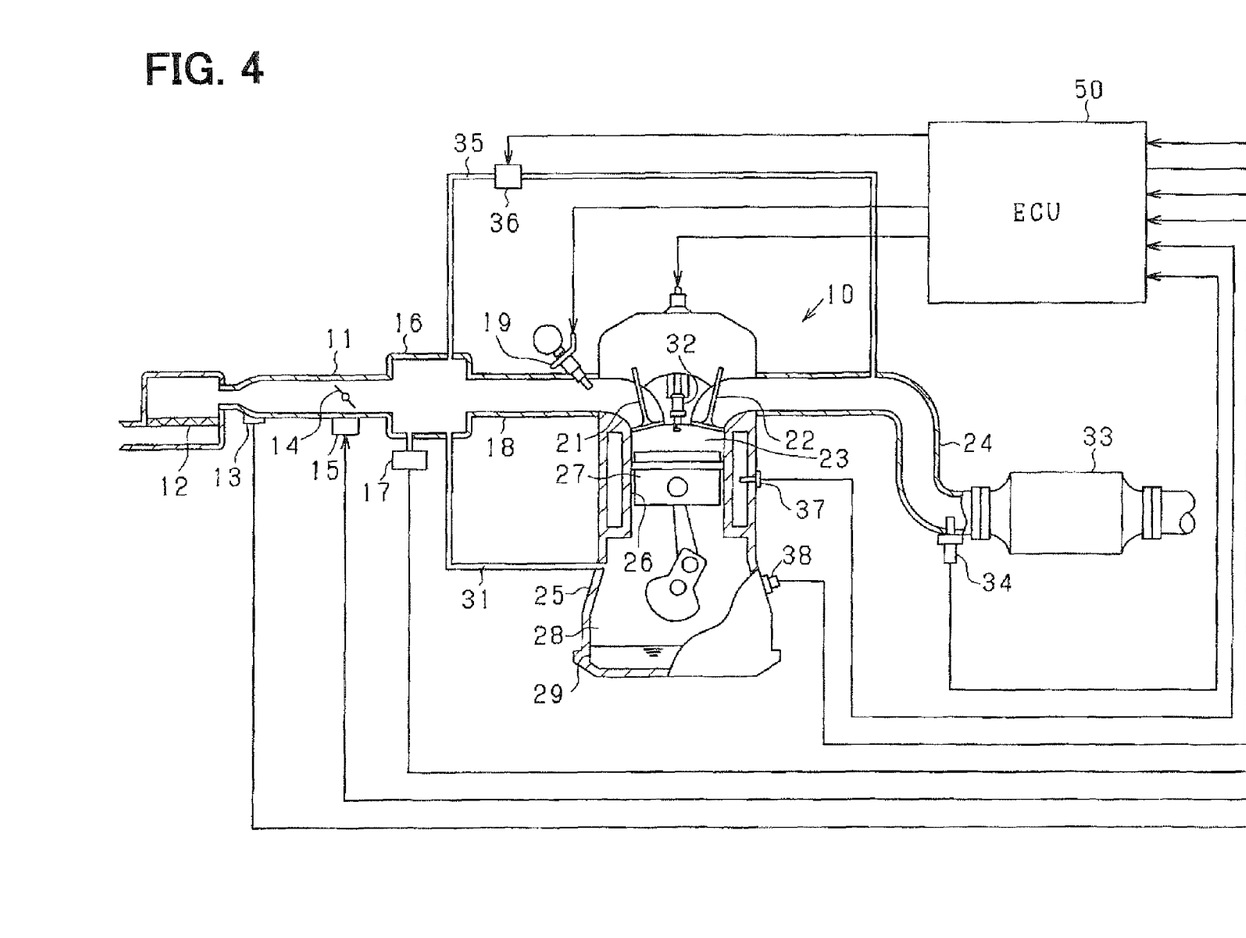
FIG. 4 is a schematic diagram showing an entire construction of an engine control system according to a second embodiment of the present invention.

The system configuration of the present embodiment is different from the first embodiment mainly in that the exhaust pipe 24 upstream of the three-way catalyst 33 is connected to the intake system (surge tank 16 in present embodiment) via an EGR passage 35 as shown in FIG. 4. Alternatively, the EGR passage 35 may be connected to the exhaust system downstream of the three-way catalyst 33.

An electromagnetic EGR valve 36 is provided in the EGR passage 35 as an opening-closing valve for adjusting a flow passage cross-sectional area of the EGR passage 35. An opening degree of the EGR valve 36 (EGR opening degree) is adjusted based on a command signal from the ECU 50. Thus, a quantity of the exhaust gas recirculated from the exhaust pipe 24 to the intake passage side (i.e., EGR gas quantity) is controlled.

When the clogging abnormality of the PCV passage 31 and the EGR passage 35 is diagnosed, the clogging abnormality is diagnosed based on increase or decrease of the pulsation width at the time when an opening/closing state of the EGR valve 36 is changed in a valve-closing direction or in a valve-opening direction in the present embodiment. More specifically, it is determined that there is no clogging abnormality in the EGR passage 35 if the pulsation width of the intake air flow rate changes largely before and after a change of the opening/closing state of the EGR valve 36 when the EGR valve 36 is changed from a valve-opened state to a valve-closed state or from the valve-closed state to the valve-opened state. If the pulsation width of the intake air flow rate hardly changes or changes only slightly before and after the change of the opening/closing state of the EGR valve 36, it is determined that there is a clogging abnormality in the EGR passage 35.

In the present embodiment, it is determined whether there is a clogging abnormality in the PCV passage 31 or the EGR passage 35 based on a result of comparison between the pulsation width of the intake air flow rate and an abnormality determination value. If it is determined that the abnormality exists in either of the branch passages, abnormality determination, which is performed by changing the opening degree of the EGR valve 36, is performed. Thus, it is determined whether the PCV passage 31 or the EGR passage 35 has the clogging abnormality.

Figure 5:
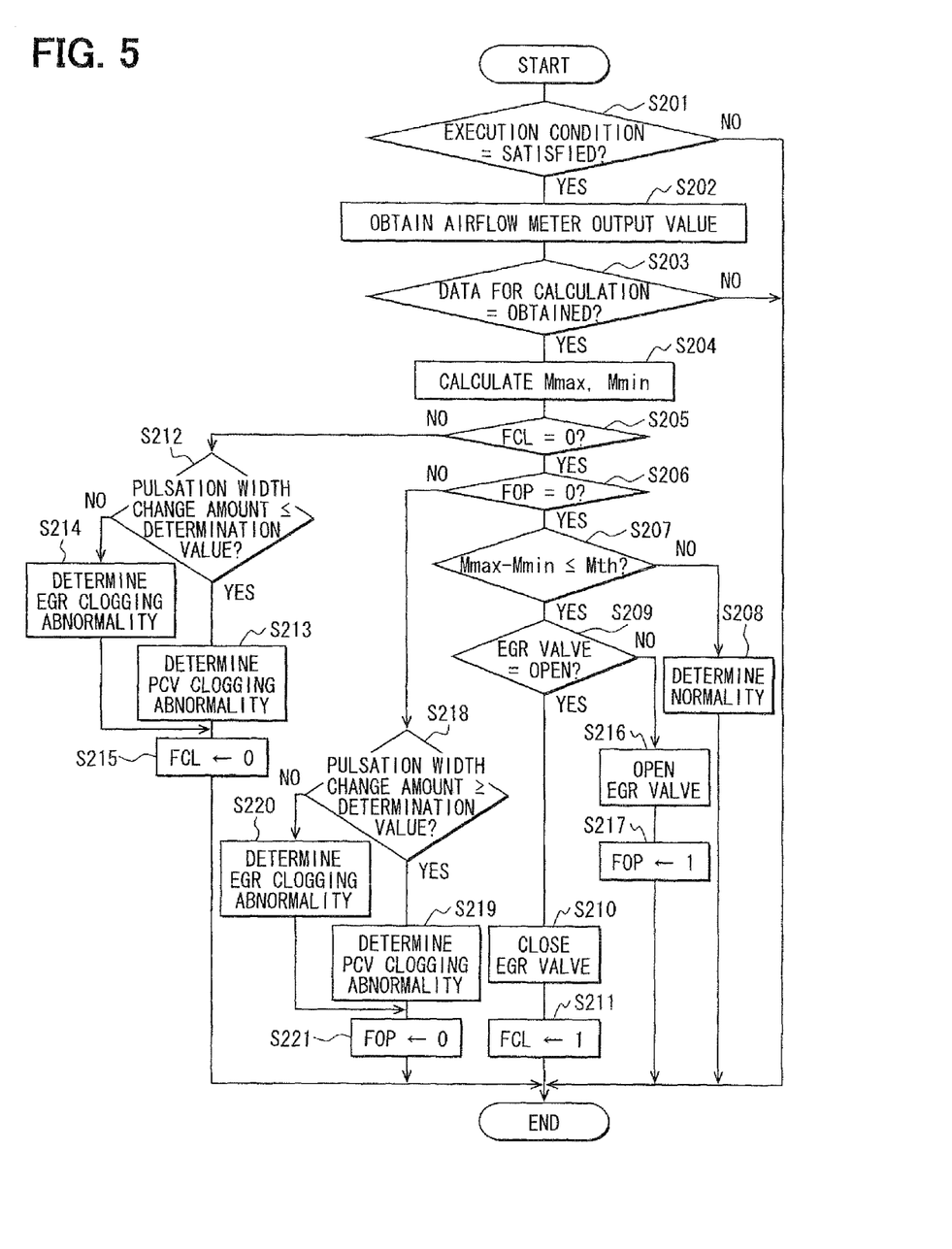
FIG. 5 is a flowchart showing a processing procedure of clogging abnormality diagnosis processing of a PCV passage and an EGR passage according to the second embodiment.

FIG. 5 is a flowchart showing a processing procedure of the abnormality diagnosis processing for diagnosing the clogging abnormality of the PCV passage 31 and the EGR passage 35. The ECU 50 repeatedly performs the processing in every predetermined cycle. The step number used in the flowchart of FIG. 3 is used for the similar processing in FIG. 5.

Processing similar to the processing in S101 to S104 of FIG. 3 is performed in S201 to S204 of FIG. 5. Thus, the maximum value Mmax and the minimum value Mmin of the air flow meter output value are calculated and stored.

In following S205, it is determined whether a value "0" is set in a valve-closing flag FCL. In S206, it is determined whether a value "0" is set in a valve-opening flag FOP. The valve-closing flag FCL indicates that the EGR valve 36 has been changed from the valve-opened state to the valve-closed state during the execution of the processing. The valve-closing flag FCL is set at a value "1" when the EGR valve 36 is changed from the valve-opened state to the valve-closed state during the execution of the processing. The valve-opening flag FOP indicates that the EGR valve 36 has been changed from the valve-closed state to the valve-opened state during the execution of the processing. The valve-opening flag FOP is set to a value "1" when the EGR valve 36 is changed from the valve-closed state to the valve-opened state during the execution of the processing.

If the valve-closing flag FCL and the valve-opening flag FOP are the values "0," the determinations in S205 and S206 are affirmed, and then the process proceeds to S207. In S207, the pulsation width is calculated by subtracting the minimum value Mmin from the maximum value Mmax and is stored. In addition, it is determined whether the calculated pulsation width is equal to or smaller than the abnormality determination value Mth. When the pulsation width is larger than the abnormality determination value Mth, the process proceeds to S208, in which it is determined that there is no clogging abnormality in the PCV passage 31 and the EGR passage 35. Then, the processing is ended.

If the pulsation width is equal to or smaller than the abnormality determination value Mth, it is determined that the clogging abnormality has occurred in either the PCV passage 31 or the EGR passage 35. Then, it is determined whether the PCV passage 31 or the EGR passage 35 has the clogging abnormality in following processing.

That is, when the pulsation width is equal to or smaller than the abnormality determination value Mth, the process proceeds to S209, in which it is determined whether the EGR valve 36 is in the valve-opened state. When the EGR valve 36 is in the valve-opened state, the process proceeds to S210, in which the EGR valve 36 is changed from the valve-opened state to the valve-closed state. In S211, the value "1" is set in the valve-closing flag FCL. Then, the routine is once ended.

Then, the processing from S201 to S204 is performed. Thus, the maximum value Mmax and the minimum value Mmin of the air flow meter output value in the state where the EGR valve 36 is closed are calculated. Since the value "1" is set in the valve-closing flag FCL then, the determination in S205 is negated, and the process proceeds to processing of S212 and following steps.

In S212, the pulsation width is calculated from the maximum value Mmax and the minimum value Mmin of the intake air flow rate in the state where the EGR valve 36 is closed, i.e., in the state where only the PCV passage 31 is opened. In addition, it is determined whether the calculated pulsation width has changed from the value before the valve-closing. In this determination, a change amount ($\leq 0$) of the pulsation width accompanying the change of the EGR valve 36 from the valve-opened state to the valve-closed state is calculated by subtracting a previous value of the pulsation width (value before valve-closing) from a present value of the pulsation width (value after valve-closing). It is determined whether the change amount is equal to or smaller than a predetermined determination value, which is zero or is defined as a negative value close to zero.

If the opening degree of the EGR valve 36 is changed to reduce the flow passage cross-sectional area of the EGR passage 35, a phenomenon similar to the phenomenon caused by the occurrence of the clogging abnormality arises in the EGR passage 35. That is, like the case of the PCV passage 31 (FIG. 2), the pulsation width of the intake air flow rate sensed with the air flow meter 13 reduces as the flow passage cross-sectional area of the EGR passage 35 reduces.

Therefore, when the EGR valve 36 is changed from the valve-opened state to the valve-closed state under a situation where there is no clogging abnormality in the EGR passage 35, the flow passage cross-sectional area of the EGR passage 35 reduces with the change of the EGR valve 36. As a result, the pulsation width of the intake air flow rate reduces. When the clogging abnormality exists in the EGR passage 35, the pulsation width of the intake air flow rate is small due to the clogging regardless of the opening/closing state of the EGR valve 36. Therefore, even if the EGR valve 36 is changed from the valve-opened state to the valve-closed state, the pulsation width of the intake air does not change largely before and after the change of the EGR valve 36.

There is presently the situation where it is estimated that the clogging abnormality exists in the PCV passage 31 or the EGR passage 35 based on the comparison between the pulsation width of the intake air flow rate and the abnormality determination value Mth. Therefore, it is thought that the cause of the clogging abnormality exists in the PCV passage 31 when the EGR passage 35 is normal. It is thought that the cause of the clogging abnormality exists in the EGR passage 35 when the PCV passage 31 is normal. Therefore, in the present embodiment, when the change amount ($\leqq 0$) of the pulsation width accompanying the change of the EGR valve 36 from the valve-opened state to the valve-closed state is equal to or smaller than the predetermined determination value, the process proceeds to S213. In S213, it is diagnosed that the EGR passage 35 is normal and there is the clogging abnormality in the PCV passage 31. When the change amount of the pulsation width accompanying the change of the EGR valve 36 from the valve-opened state to the valve-closed state is larger than the predetermined determination value, the process proceeds to S214. In S214, it is diagnosed that the PCV passage 31 is normal and there is the clogging abnormality in the EGR passage 35. Then, in S215, the valve-closing flag FCL is reset to a value "0" and then the routine is ended.

If the EGR valve 36 is in the valve-closed state in S209, the process proceeds to S216, in which the EGR valve 36 is changed from the valve-closed state to the valve-opened state. The value "1" is set in the valve-opening flag FOP in S217. Then, the routine is once ended.

Then, the processing of S201 to S204 is performed to calculate the maximum value Mmax and the minimum value Mmin of the air flow meter output value in the valve-opened state of the EGR valve 36. At that time, since the value "0" is set in the valve-closing flag FCL and the value "1" is set in the valve-opening flag FOP, the determination in S205 is affirmed and then the determination in S206 is negated. Then, the process proceeds to processing of S218 and following steps.

In S218, the pulsation width is calculated from the maximum value Mmax and the minimum value Mmin of the air flow rate in the state where the EGR valve 36 is opened, i.e., in the state where the EGR passage 35 and the PCV passage 31 are opened. It is determined whether the calculated pulsation width has changed from the value before the valve-opening. The change amount ($\geqq 0$) of the pulsation width accompanying the change of the EGR valve 36 from the valve-closed state to the valve-opened state is calculated by subtracting the previous value of the pulsation width (value before valve-opening) from the present value of the pulsation width (value after valve-opening). It is determined whether the change amount is equal to or larger than a predetermined determination value, which is zero or is defined as a positive value close to zero.

If the clogging does not exist in the EGR passage 35 at that time, the flow passage cross-sectional area of the EGR passage 35 increases because of the change of the EGR valve 36 from the valve-closed state to the valve-opened state. As a result, the pulsation width of the intake air flow rate increases. If the clogging exists in the EGR passage 35, the pulsation width of the intake air does not change or changes only slightly before and after the change of the EGR valve 36 even when the EGR valve 36 is changed from the valve-closed state to the valve-opened state. Therefore, when the change amount ($\geqq 0$) of the pulsation width accompanying the change of the EGR valve 36 from the valve-closed state to the valve-opened state is equal to or larger than the predetermined determination value, the process proceeds to S219. In S219, it is diagnosed that the EGR passage 35 is normal and the PCV passage 31 has the clogging abnormality. When the change amount of the pulsation width is smaller than the predetermined determination value, the process proceeds to S220, in which it is diagnosed that the PCV passage 31 is normal and the EGR passage 35 has the clogging abnormality. Then, in S221, the valve-opening flag FOP is reset to the value "0" and then the routine is ended.

The present embodiment described above exerts a following effect.

The clogging abnormality of the PCV passage 31 and the EGR passage 35 is diagnosed based on the opening/closing state of the EGR valve 36 provided in the EGR passage 35 and the pulsation width. More specifically, the clogging abnormality is diagnosed based on the increase or decrease of the pulsation width at the time when the EGR valve 36 is changed in the valve-closing direction or the valve-opening direction. Therefore, in the construction having the multiple branch passages branching from the intake system, the branch passage causing the clogging abnormality can be specified when the clogging abnormality occurs in at least one of the branch passages.

(Other Embodiments)

The present invention is not limited to the above-described embodiments but may be implemented as follows, for example.

In the above-described embodiments, the abnormality determination value Mth is the fixed value. Alternatively, the abnormality determination value Mth may be variably set according to the average flow rate of the air flowing through the intake passage. More specifically, a relationship between the average value of the air flow rate sensed with the air flow meter 13 and the abnormality determination value Mth may be defined and stored in the ROM or the like beforehand. Then, the abnormality determination value Mth corresponding to the average value of the present air flow rate (average flow rate in predetermined time) may be calculated. In this case, the abnormality determination value Mth may be increased as the average flow rate in the intake passage increases. Alternatively, the average flow rate may be replaced with the throttle opening degree, and the throttle opening degree may be related to the abnormality determination value Mth.

in the construction having the EGR passage 35 and the EGR valve 36, the opening/closing state of the EGR valve 36 is determined. When it is determined that the EGR valve 36 is in the valve-closed state, the clogging abnormality of the PCV passage 31 is diagnosed based on the pulsation width of the intake air flow rate. When the EGR valve 36 is in the valve-opened state, there is a possibility that the pulsation width of the intake air flow rate has been decreased by the clogging abnormality in the EGR passage 35. Accordingly, there can be a case where the occurrence of the clogging abnormality in the PCV passage 31 cannot be specified. Therefore, the clogging abnormality diagnosis of the PCV passage 31 may be performed in the state where the diagnosis is not affected by the flow of the fluid flowing from the EGR passage 35 to the intake system, i.e., in the state where the EGR valve 36 is closed.

When it is determined that the EGR valve 36 is in the valve-opened state as the result of the determination about the opening/closing state of the EGR valve 36, the EGR valve 36 may be changed to the valve-closed state and then the clogging abnormality of the PCV passage 31 may be diagnosed based on the pulsation width of the intake air flow rate.

The abnormality diagnosis of the PCV passage 31 is performed based on the pulsation width of the intake air flow rate at the time when the EGR valve 36 is in the valve-closed state, and the opening/closing state of the EGR valve 36 is changed before or after the diagnosis. Thus, the clogging abnormality of the EGR passage 35 is diagnosed based on the increase/decrease in the pulsation width before and after the change of the opening/closing state of the EGR valve 36. With such the construction, the clogging abnormality of the PCV passage 31 and the EGR passage 35 can be diagnosed as in the above-described second embodiment. Moreover, the branch passage causing the clogging abnormality can be specified correctly.

The present invention may be applied to a construction, in which the PCV passage 31 has an opening-closing valve (PCV valve) for adjusting the flow passage cross-sectional area of the PCV passage 31. In this case, in the above-described first embodiment, the abnormality determination is performed based on the comparison result between the pulsation width of the intake air flow rate and the abnormality determination value Mth on the condition that the PCV valve is in the valve-opened state. That is, the execution condition of the abnormality diagnosis includes that the PCV valve is in the valve-opened state. When it is determined that the execution condition is satisfied in S101 of FIG. 3, the processing of S102 and following steps is performed.

In the above-described S107 of FIG. 3, the clogging abnormality of the PCV passage 31 is determined based on the result of the comparison between the pulsation width of the intake air flow rate and the abnormality determination value Mth. Alternatively, when the PCV passage 31 has the PCV valve, the clogging abnormality of the PCV passage 31 may be determined based on the increase or decrease of the pulsation width of the intake air flow rate at the time when the opening degree of the PCV valve is changed in a valve-closing direction or a valve-opening direction. It is diagnosed that there is the clogging abnormality in the PCV passage 31 when the pulsation width does not change before and after the change in the opening degree of the PCV valve although the PCV valve is changed in the valve-closing direction or in the valve-opening direction.

In the above-described embodiments, the thermal type flow sensor having the heating section and the temperature sensing section on the semiconductor substrate is adopted as the air flow meter 13. Alternatively, an other type of flow sensor such as a hot-wire flow sensor may be used.

In the above-described embodiments, the clogging abnormality of the PCV passage 31 and the EGR passage 35 is diagnosed. The present invention is not limited thereto. Alternatively, the present invention may be applied to diagnosis of a clogging abnormality of an other branch passage branching from the intake system.

In the above-described embodiment, the present invention is applied to the vehicle, in which the gasoline engine is mounted. Alternatively, the present invention may be applied to a vehicle, in which a diesel engine is mounted.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An abnormality diagnosis device of an internal combustion engine having a PCV passage as a branch passage connected to an intake system of the internal combustion engine for recirculating a blow-by gas to the intake system and a flow sensor provided upstream of a connection between the PCV passage and the intake system in the intake system for sensing an intake air flow rate, the abnormality diagnosis device comprising:
    a pulsation width sensing means for sensing pulsation width of the intake air flow rate sensed with the flow sensor; and
    an abnormality diagnosing means for diagnosing a clogging abnormality of the PCV passage based on the sensed pulsation width.

2. The abnormality diagnosis device as in claim 1, wherein the abnormality diagnosing means performs the abnormality diagnosis based on the pulsation width when an average flow rate of a fluid passing through the intake system is in a predetermined low flow rate range.

3. The abnormality diagnosis device as in claim 1, wherein the flow sensor is a thermal type sensor that has a heating section and a temperature sensing section provided on a semiconductor substrate.

4. The abnormality diagnosis device as in claim 1, wherein the internal combustion engine has another branch passage in addition to the PCV passage, the another branch passage branching from the intake system downstream of the flow sensor, and an opening-closing valve that adjusts a flow passage cross-sectional area of at least one of the branch passages including the PCV passage, wherein
    the abnormality diagnosing means diagnoses a clogging abnormality in at least one of the branch passages including the PCV passage based on an opening/closing state of the opening-closing valve and the pulsation width.

5. The abnormality diagnosis device as in claim 4, wherein the abnormality diagnosing means diagnoses the clogging abnormality based on increase or decrease in the pulsation width at the time when the opening/closing state of the opening-closing valve is changed in a valve-closing direction or in a valve-opening direction.

6. The abnormality diagnosis device as in claim 4, wherein the another branch passage is an EGR passage for providing communication between an exhaust system and the intake system of the internal combustion engine and for recirculating a part of exhaust gas to the intake system.

\* \* \* \* \*